(12) United States Patent
Dittrich

(10) Patent No.: US 6,382,088 B2
(45) Date of Patent: *May 7, 2002

(54) APPARATUS FOR THE STORAGE OF DOUGH PRODUCTS IN A FERMENTATION CHAMBER

(75) Inventor: Bernd Dittrich, Marl (DE)

(73) Assignee: Backerei Brinker GmbH, Herne (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/303,472

(22) Filed: Apr. 30, 1999

(51) Int. Cl.⁷ ................................ A23B 4/04
(52) U.S. Cl. ................ 99/477; 99/443 C; 99/467; 99/476; 99/478
(58) Field of Search .................. 99/467, 477, 476, 99/478, 443 C

(56) References Cited

U.S. PATENT DOCUMENTS

| | | | | |
|---|---|---|---|---|
| 1,858,086 A | * | 5/1932 | House | 99/467 |
| 4,029,004 A | * | 6/1977 | Isenberg | 99/477 |
| 5,396,835 A | * | 3/1995 | Savolainen et al. | 99/477 |
| 5,473,978 A | * | 12/1995 | Colombo | 99/477 |

* cited by examiner

Primary Examiner—Milton I. Cano
Assistant Examiner—H. Mai
(74) Attorney, Agent, or Firm—Herbert Dubno

(57) ABSTRACT

Dough products are stored in a fermentation chamber on a rack system in which in each of a multiplicity of horizontal planes located one above the other, the palettes carrying the dough products are substantially contiguous and are pushed from rack to rack section from the upstream side to the downstream side upon the insertion of a palette at the upstream side. The empty palettes are recirculated below the palettes carrying the dough products and the displacement is effected solely by pressing of each upstream palette against the next downstream palette.

6 Claims, 4 Drawing Sheets

APPARATUS FOR THE STORAGE OF DOUGH PRODUCTS IN A FERMENTATION CHAMBER

FIELD OF THE INVENTION

My present invention relates to an apparatus for the storage of dough products in a fermentation chamber, especially for the production of bread, rolls and other yeast-containing or risable dough products which, as part of the production process, usually require storage for a predetermined time period in a fermentation chamber prior to baking. More particularly the invention relates to a storage facility of this type in which the dough products are placed upon horizontal pallets which can be disposed one above another in superposed planes.

BACKGROUND OF THE INVENTION

It is known to store dough products, for example for bread, rolls and other rising bakery items, usually made with yeast, on displaceable multilevel racks which can be inserted into a fermentation chamber and such that the dough products lie on pallets at the respective levels or forming the respective tiers of the multitier rack. It is also known to displace dough products on conveyor belts through a fermentation chamber. In the first case, considerable work is involved in moving around the racks and in the second case the conveyor apparatus can be complex and expensive and can require significant amounts of space for a given output of the system.

OBJECTS OF THE INVENTION

It is, therefore, the principal object of the present invention to provide an improved apparatus for the storage of dough products for a limited period of time in a fermentation chamber which has technically inexpensive apparatus, has more efficient utilization of space and requires significantly less manpower than earlier systems.

Another object of the invention is to provide an improved apparatus for the storage of dough products in a fermentation chamber which is more reliable and less costly than earlier systems and which requires less floor space or has a smaller footprint than some earlier systems.

It is also an object of the invention to obviate drawbacks of earlier systems for the storage of dough products in a fermentation chamber.

SUMMARY OF THE INVENTION

These objects and others which will become apparent hereinafter are attained, in accordance with the invention which provides a plurality of cabinet sections each with a multiplicity of pallets disposed one above the other and adapted to receive the dough products, the pallets being horizontally shiftable in their respective cabinets and the pallets being so closely juxtaposed, i.e. substantially contiguous in each plane, so that a shifting of the pallets in a given plane at the charging side of the apparatus will result in a horizontal shift of all of the pallets in that plane to transfer a pallet at the discharge side of the system to a discharge means. With such an apparatus, the loading device or means at the upstream side of the row of cabinets can insert a pallet or tray loaded with dough products into the first cabinet or rack, thereby shifting the pallet previously therein and all other pallets in the same horizontal plane toward the downstream end where the pallets from the last cabinet or rack are deposited on the discharge means which enables the pallet to be carried away.

With this apparatus, therefore, the insertion of a pallet or tray at the upstream side in one plane shifts all of the pallet in this plane and discharges a pallet at the discharge side. This is accomplished without conveyor belts and without manual intervention between the ends of the system.

It has been found to be advantageous in each of the cabinet sections to provide a plurality of pallets or trays in stacked relationship, i.e. one above the other, so that each of the pallets or trays can be shifted horizontally. The several cabinet sections or racks should then be particularly close together so that each pallet can bear upon the next between the upstream and downstream sides. The cabinet or rack sections are also provided close together so that the guides for the pallets in each plane can be flush with each other.

It has been found to be advantageous to provide at the charging side of the system and at the discharge side of the system respective elevator arrangements for loading the pallets onto the respective planes and receiving the pallets from the respective planes. The elevators can vertically shift the pallet and align them in the guides for the respective planes. The pallets can also be returned from the discharge side to the charging side without an additional conveyor belt by providing a space below the stack of pallets in the racks or cabinets for enabling the pallets to push one another from the discharge side to the charging side, thereby again doing without a conveyor belt. An empty pallet thus emerges from the return path at the charge side and can be reloaded with the dough products for insertion into the fermentation chamber.

BRIEF DESCRIPTION OF THE DRAWING

The above and other objects, features, and advantages will become more readily apparent from the following description, reference being made to the accompanying drawing in which.

SPECIFIC DESCRIPTION

Figure 3:
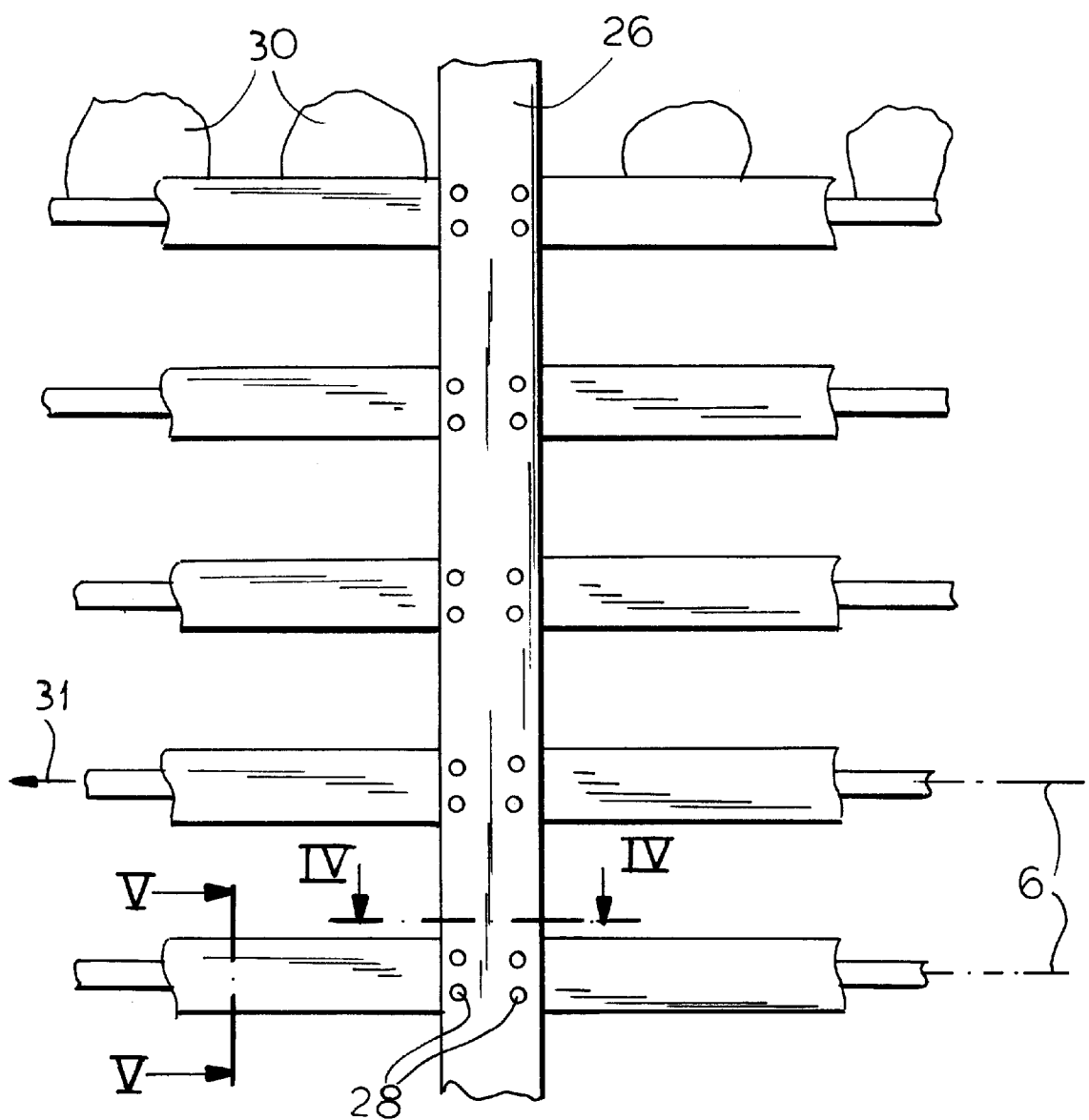
FIG. 3 is a detail showing the junction between two cabinets and the flush arrangement of the U-section or channel guides for the pallets.
Figure 4:
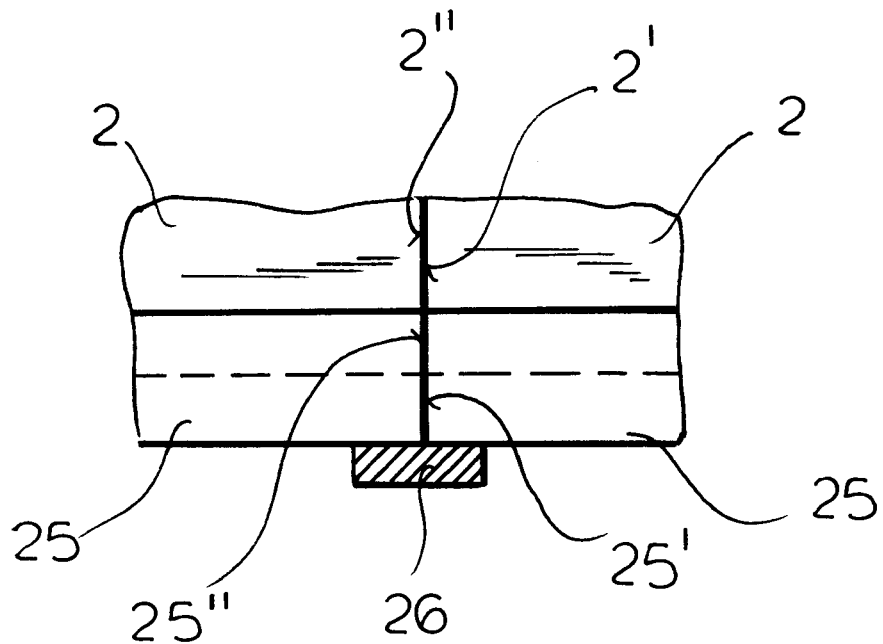
FIG. 4 is a section taken along the line IV—IV of FIG. 3.

Within a fermentation chamber which can also be used as a baking chamber, if desired, at the downstream end, racks 26 (FIGS. 3 and 4) can be provided with U-shaped or channel guides 25 to define a cabinet 3 with a succession of sections.

The dough products 30 (FIG. 3) which are to rise in the fermentation chamber, are carried by flat pallets or trays 2 which can be rectangular in the preferred shape and are guided in the channels 27 of horizontal guide sections 25 secured by bolts or rivets 28 to the uprights 26 of the racks.

The cabinet 23 has a charging side 4 at which the pallets 2 are fed to the storage rack. At the discharge side 5 at the opposite end of the rack or cabinet, the pallets are removed from the rack or cabinet, the dough products 30 having risen sufficiently or, if baking is involved, having been at least partly baked.

Figure 1:
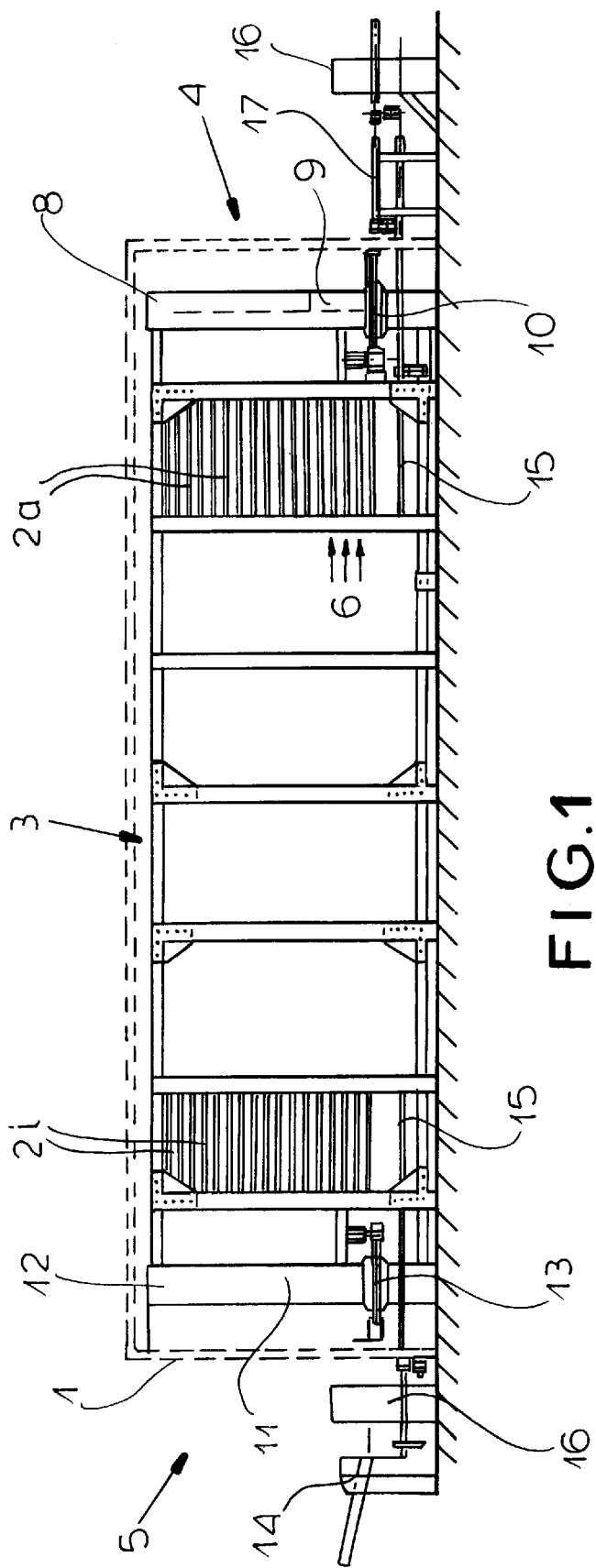
FIG. 1 is a diagrammatic side elevational view of an apparatus for the temporary storage of dough products in a fermentation chamber.
Figure 5:
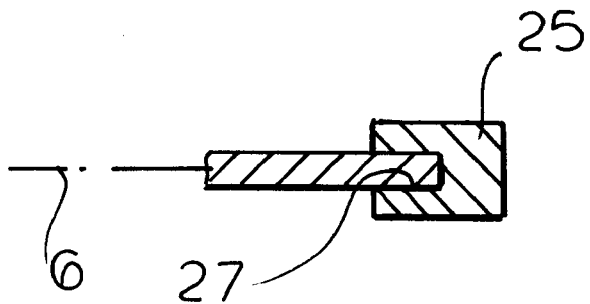
FIG. 5 is a section taken along the line V—V of FIG. 4.

The cabinet 3 has a multiplicity of superposed horizontal planes 6 which can correspond to the horizontal median plane through the channel-shaped guides 25 which are of U-section as can be seen from FIG. 5. Such guides engage the opposite narrow edges of the pallets 2 as they slide along the respective planes in the respective channels 27 in the direction of arrow 31, i.e. from the right to the left in FIGS. 1 and 2. In each of the planes 6 there are nine contiguous pallets 2, i.e. pallets which lie close together along their longitudinal edges and abut one another.

Figure 2:
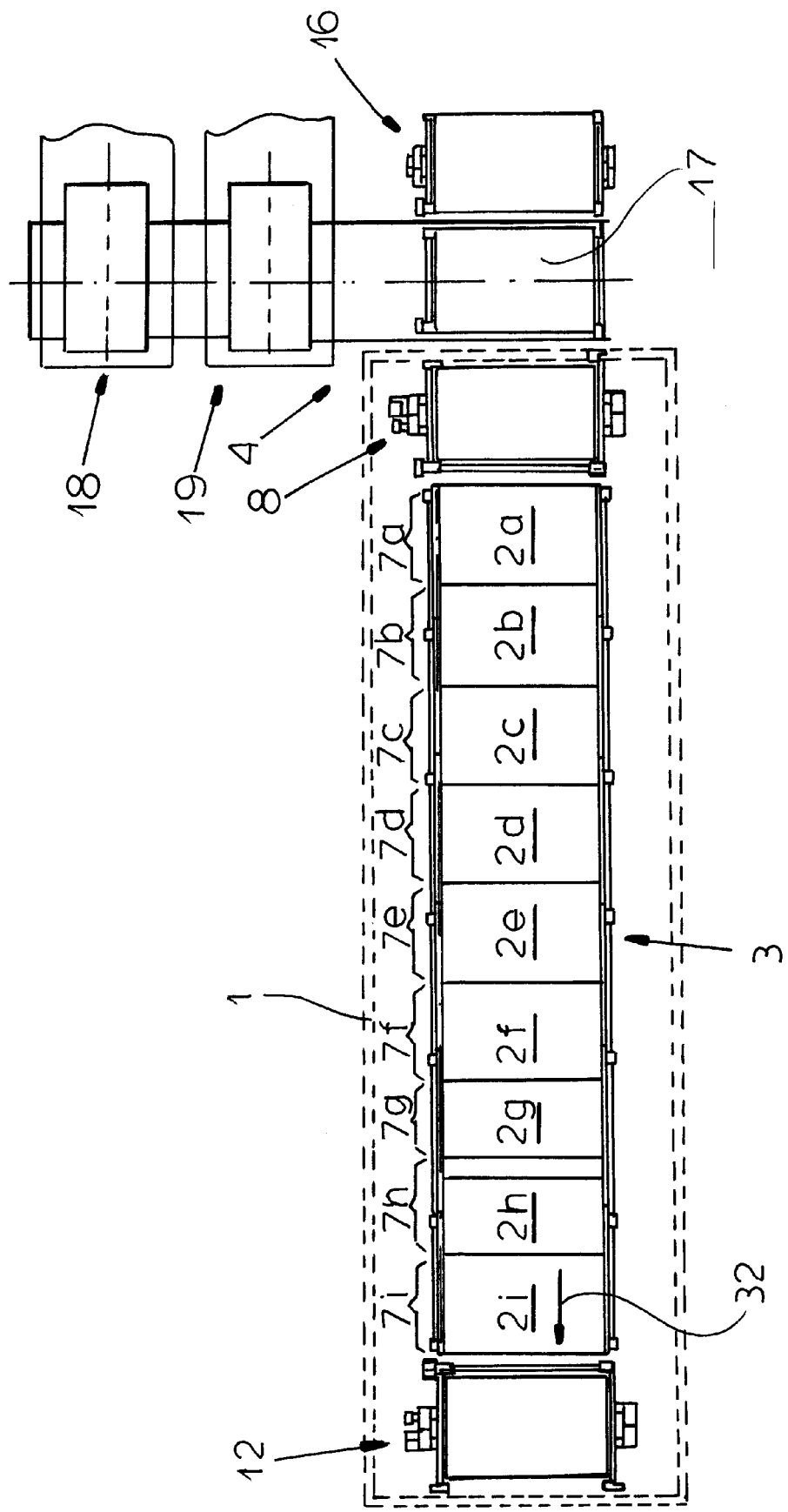
FIG. 2 is a plan view, also in highly diagrammatic form, of this apparatus.

In FIG. 2 the nine contiguous pallets have been represented at 2a–2i.

If the pallet 2a at the upstream or inlet side is thus pushed in the direction of the arrow 32 previously mentioned, each pallet of the nine contiguous pallets pushes the pallet ahead of it in the same direction so that all of the remaining pallets are advanced by one pallet width and the pallet 2i closest to the discharge side 5 is pushed out of the cabinet 3 and can be removed.

Since the cabinet 3 has a large number of planes 6 disposed one above the other in each of which a row of pallets lie, in each of the cabinet sections 7 there are a multiplicity of pallets with those at the upstream cabinet section 7a being loaded in succession by a loading unit 8, also referred to as a charging unit, provided with an elevator 9 with a vertically shiftable charging head capable of alignment with the channels 27 of a respective plane 6 and the insertion of a new pallet with fresh dough products 30 thereon. With each such loading all of the pallets of that plane are advanced to the discharge side and the pallet in the same plane from the last cabinet section 7i is discharged. The pallets can be loaded from bottom to top or top to bottom by the elevator and the charging unit 10.

On the discharge side 5 there is also an elevator 11 and a discharge unit 12 which can be raised and lowered by the elevator to receive the pallets which are forced out of the last cabinet section 7i of the series of such sections 7a–7i. The devices 10 and 13 are, of course, synchronized to operate in the same plane and to move from plane to plane together.

A grabbler 14 can remove the dough products which have risen sufficiently from the pallets at the discharge end and the empty pallets 2 can be returned to the charging side 4 along a return path 15, likewise by pushing one pallet against the other, below the pallets which carry the dough products. In the return the pallets 2 are advanced cyclically as well with each discharged pallet being pressed onto the path 15 to advance all of the other pallets therealong.

The empty pallets, upon arrival at the upstream cabinet section 7a can be loaded at 16 with dough products and fed to the charging unit 10. Between the charging station 6 and the recycle unit 16, a storage facility 17 can be provided for the pallet 2 and, as has been shown in FIG. 2, adjacent the charging station 8 two additional units 18 and 19 can be provided for supplying pallets filled with dough products at the charging side.

From FIG. 2 it can be seen that the leading edge 2" of one of the pallets 2 can press upon the trailing edge 2' of the pallet 2 immediately ahead of it (FIG. 4) and further that the guides 25 are flush with one another at their ends or edges 25', 25".

I claim:

1. An apparatus for storing dough products in a fermentation chamber, comprising:
   a plurality of cabinet sections arrayed in succession in a fermentation chamber for such dough products from an upstream charging side to a downstream discharging side; and
   a plurality of individual flat pallets forming respective shiftable trays for carrying dough products to be stored in said fermentation chamber for a certain period of time, said pallets being spaced apart one above another in each of said cabinet sections with corresponding pallets of all of said sections lying in a common horizontal plane, all of the pallets in each common horizontal plane being horizontally shiftable without a conveyor belt and being contiguous from cabinet section to cabinet section so that insertion of an inserted pallet into a cabinet section in each plane at said charging side directly shifts all of the other pallets in the respective plane toward said discharging side and one of said other pallets out of the cabinet section at said discharging side solely by said insertion of said inserted pallet.

2. The apparatus defined in claim 1 wherein said pallets are rectangular.

3. The apparatus defined in claim 1 wherein each of said cabinet sections is provided with respective guides for the pallets in each of said planes and the guides in each plane of successive cabinet sections are aligned and contiguous with one another.

4. An apparatus for storing dough products in a fermentation chamber, comprising:
   a plurality of cabinet sections arrayed in succession in a fermentation chamber for such dough products from an upstream charging side to a downstream discharging side; and
   a plurality of individual flat pallets forming shiftable respective trays for carrying dough products to be stored in said fermentation chamber for a certain period of time, said pallets being spaced apart one above another in each of said cabinet sections with corresponding pallets of all of said sections lying in a common horizontal plane, all of the pallets in each common horizontal plane being horizontally shiftable without a conveyor belt and being contiguous from cabinet section to cabinet section so that insertion of an inserted pallet into a cabinet section in each plane at said charging side directly shifts all of the other pallets in the respective plane toward said discharging side and one of said other pallets out of the cabinet section at said discharging side solely by said insertion of said inserted pallet, a charging unit being provided at said upstream charging side and a discharging unit being provided at said discharging side, each of said units having an elevator and means displaceable by said elevator into alignment with a respective plane for feeding a pallet in the respective plane at said upstream charging side and removing a pallet in said plane at said downstream discharging side.

5. The apparatus defined in claim 4 wherein said elevators are synchronized with one another.

6. The apparatus defined in claim 4, further comprising means below said planes for displacing said pallets from said downstream discharging side to said upstream charging side.

* * * * *